(12) United States Patent
Li et al.

(10) Patent No.: US 9,893,352 B2
(45) Date of Patent: Feb. 13, 2018

(54) COMPOSITION FOR REDUCING MOISTURE IN A BATTERY ELECTROLYTE

(71) Applicant: Ford Global Technologies, LLC, Dearborn, MI (US)

(72) Inventors: Feng Li, Troy, MI (US); Chi Paik, Brownstown Township, MI (US); Jun Yang, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 15/210,481

(22) Filed: Jul. 14, 2016

(65) Prior Publication Data

US 2016/0322631 A1   Nov. 3, 2016

Related U.S. Application Data

(63) Continuation of application No. 14/155,740, filed on Jan. 15, 2014, now Pat. No. 9,406,932.

(51) Int. Cl.
| | |
|---|---|
| *H01M 4/38* | (2006.01) |
| *H01M 4/13* | (2010.01) |
| *H01M 4/36* | (2006.01) |
| *H01M 4/62* | (2006.01) |
| *H01M 10/0525* | (2010.01) |
| *H01M 10/04* | (2006.01) |

(52) U.S. Cl.
CPC ............. *H01M 4/383* (2013.01); *H01M 4/13* (2013.01); *H01M 4/366* (2013.01); *H01M 4/628* (2013.01); *H01M 10/0427* (2013.01); *H01M 10/0525* (2013.01); *Y02E 60/122* (2013.01); *Y02T 10/7011* (2013.01)

(58) Field of Classification Search
CPC .............................. H01M 4/383; H01M 4/628
USPC ......................................................... 429/199
See application file for complete search history.

(56) References Cited

U.S. PATENT DOCUMENTS

| | | |
|---|---|---|
| 5,162,169 A | 11/1992 | Tomantschger et al. |
| 5,424,145 A | 6/1995 | Tomantschger et al. |
| 6,270,925 B1 | 8/2001 | Takada et al. |
| 2006/0063071 A1 | 3/2006 | Yasuda et al. |
| 2008/0187824 A1 | 8/2008 | Tomantschger |
| 2009/0053599 A1 | 2/2009 | Ichihashi et al. |
| 2009/0134842 A1 | 5/2009 | Joshi et al. |
| 2011/0274965 A1 | 11/2011 | Yamada et al. |

*Primary Examiner* — Basia Ridley
*Assistant Examiner* — James Erwin
(74) *Attorney, Agent, or Firm* — David B. Kelley; Brooks Kushman P.C.

(57) ABSTRACT

In at least one embodiment, a method of scavenging hydrogen in a lithium-ion battery is provided. The method may comprise including an atomic intermetallic material in at least one of a positive electrode or a negative electrode of a lithium-ion battery and reacting hydrogen present inside the lithium-ion battery with the atomic intermetallic material to form a metal hydride. The method may include preparing a positive electrode slurry and a negative electrode slurry, each slurry including an active material and a binder, mixing an atomic intermetallic material including a proton absorbed state into at least one of the slurries, and casting the slurries to form a positive electrode and a negative electrode. The method may alternately include applying an atomic intermetallic material including a proton absorbed state to a surface of at least one of a lithium-ion battery positive electrode or negative electrode.

20 Claims, 2 Drawing Sheets

COMPOSITION FOR REDUCING MOISTURE IN A BATTERY ELECTROLYTE

CROSS-REFERENCE TO RELATED APPLICATIONS

This application is a continuation of U.S. application Ser. No. 14/155,740 filed Jan. 15, 2014, now U.S. Pat. No. 9,406,932 issued Aug. 2, 2016, the disclosure of which is hereby incorporated in its entirety by reference herein.

TECHNICAL FIELD

This disclosure relates to compositions for reducing moisture in battery electrolytes, for example, in lithium-ion batteries.

BACKGROUND

Enhancement of battery performance is a focal point in the advancement of portable electronics, power grid regulation and electrified vehicles. Rechargeable or secondary batteries generally include positive and negative electrodes, a separator and an electrolyte. Current collectors are typically attached to each electrode in order to extract current from the battery. Lithium-ion (Li-ion) batteries are used in electric and hybrid-electric vehicles due to their relatively high voltage, high specific energy, high energy density, low self-discharge rate, long cycle life and/or wide temperature operational range. A separator is generally placed between an anode and a cathode of the Li-ion battery. The separator prevents physical contact of the two electrodes (e.g., internal short circuits), while still allowing for rapid transportation of ionic charge carriers between the cathode and anode. The electrolyte of the Li-ion batteries may generally include a conductive lithium salt and an organic solvent. A commonly used lithium salt for Li-ion batteries is lithium hexafluorophosphate ($LiPF_6$).

SUMMARY

In at least one embodiment, a lithium-ion battery is provided comprising a positive electrode, a negative electrode, a separator situated between the electrodes. At least one of the electrodes may include an atomic intermetallic material including a proton absorbed state. In one embodiment, the positive electrode may include 0.01 to 5 wt. % of the atomic intermetallic material. The atomic intermetallic material may have a hydrogen absorbency from 0.0% to 3.5% by weight of the atomic intermetallic material.

In one embodiment, the atomic intermetallic material reacts with a proton to form a metal hydride in the proton absorbed state. The atomic intermetallic material may include an $A_xB_y$ alloy, wherein A is a first metal or metal alloy, B is a second metal or metal alloy different from the first, and x and y are integers greater than or equal to 1. In one embodiment, the atomic intermetallic material is included in both the positive electrode and the negative electrode.

The battery may include an electrolyte including LiPF6. The atomic intermetallic material may be formed as a powder or as a film. The atomic intermetallic material may be coated on a surface of at least one of the electrodes adjacent to the separator. The atomic intermetallic material may also be mixed throughout a bulk of at least one of the electrodes.

In at least one embodiment, a lithium-ion battery is provided comprising an anode, a cathode, and a separator situated between the anode and cathode. The cathode may include from 0.01 to 5 wt. % of an atomic intermetallic material including a proton absorbed state. The atomic intermetallic material may react with a proton to form a metal hydride in the proton absorbed state. In one embodiment, the atomic intermetallic material includes an AxBy alloy, wherein A is a first metal or metal alloy, B is a second metal or metal alloy different from the first, and x and y are integers greater than or equal to 1. The cathode may include from 0.05 to 1 wt. % of the atomic intermetallic material.

In at least one embodiment, a lithium-ion battery is provided comprising an anode, a cathode, and a separator situated between the anode and cathode. The cathode may have a first layer including a cathode active material and a second layer including a proton absorbing material that is different from the cathode active material and has a hydrogen absorbency from 0.75% to 3.5% by weight of the proton absorbing material. The proton absorbing material may include an atomic intermetallic material including a proton absorbed state. The atomic intermetallic material may react with a proton to form a metal hydride in the proton absorbed state. In one embodiment, the atomic intermetallic material includes an AxBy alloy, wherein A is a first metal or metal alloy, B is a second metal or metal alloy different from the first, and x and y are integers greater than or equal to 1. The cathode may include from 0.01 to 5 wt. % of the proton absorbing material.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Although lithium hexafluorophosphate ($LiPF_6$) is relatively stable in dry inert atmosphere up to 107° C., it may suffer from degradation upon exposure to water and moisture. While efforts are made to reduce the moisture level in the electrolyte, trace amounts of water may be found (e.g., up to about 100 ppm). The mechanism of the degradation may include that the anion of this salt ($PF_6^-$) undergoes a reversible reaction:

$$LiPF_6(sol.) \leftrightarrow LiF(s) + PF_5(sol.)$$ (eq. 1)

where the strong Lewis acid $PF_5$ tends to further react with organic solvents and thus move the reaction of equation 1 toward products. Furthermore, labile P—F bonds are highly susceptible to hydrolysis through reacting with trace amounts of moisture in the electrolyte solvent:

$$LiPF_6(sol.)+H_2O \rightarrow POF_3(sol.)+LiF(s)+2HF(sol.) \quad (eq. 2)$$

$$PF_5(sol.)+H_2O \rightarrow POF_3(sol.)+2HF(sol.) \quad (eq. 3)$$

As a consequence, the formed hydrofluoric acid (HF) may continually react with the positive electrode (cathode) materials (e.g., LiMOx, wherein M=Mn, Co, Al, Ni, Fe, $Fe_mP_x$, or others or a combination thereof). This reaction may result in the formation of water ($H_2O$) molecules. This $LiPF_6$ decomposition cycle may continue until all of the $LiPF_6$ is consumed, which may cause performance deterioration of the Li-ion cell, significantly reduce the calendar and/or cycle life time of the cell or other problems. Therefore, it may be beneficial to remove and/or prevent moisture inside the cell and/or prevent runaway $LiPF_6$ decomposition if moisture is present. While the reactions and description in the disclosure recite $LiPF_6$ as the lithium salt, they may be applicable to other lithium salts, such as lithium hexafluoroarsenate monohydrate ($LiAsF_6$), lithium perchlorate ($LiClO_4$), lithium tetrafluoroborate ($LiBF_4$) and lithium triflate ($LiCF_3SO_3$) and others known in the art. Accordingly, the lithium ion batteries disclosed herein are not limited to $LiPF_6$, but rather its use is merely exemplary.

Figure 1:
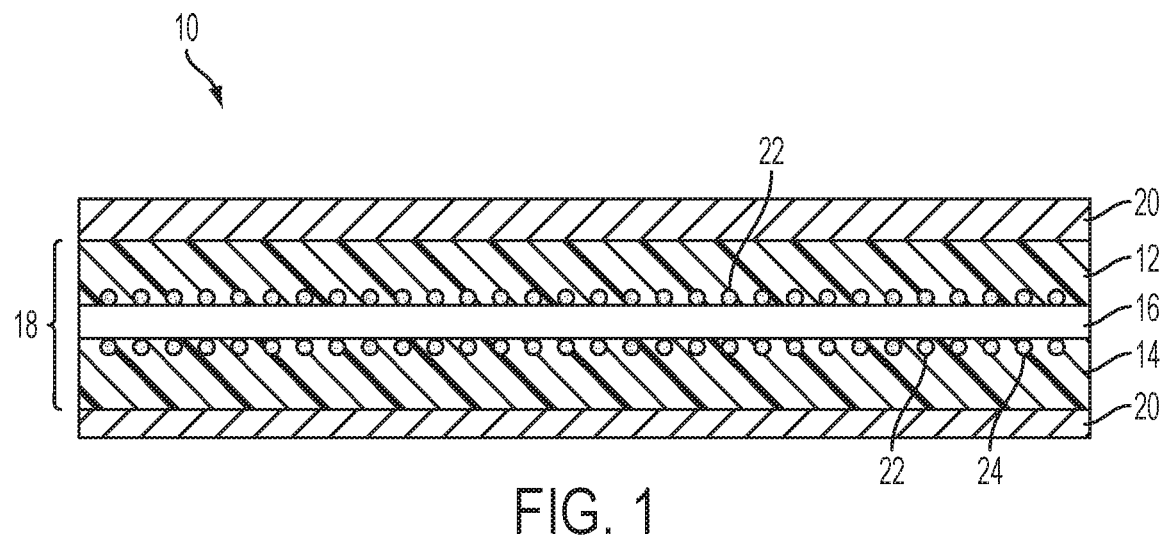
FIG. 1 is a schematic of a lithium-ion battery including a proton absorbing material, according to an embodiment.

With reference to FIG. 1, a cross-section of a battery 10 is shown, which may be a rechargeable battery (e.g., a lithium-ion battery). The battery 10 includes a negative electrode (anode) 12, a positive electrode (cathode) 14, a separator 16, and an electrolyte 18, which may be disposed within the electrodes 12, 14 and separator 16. However, the battery 10 may include additional components or may not require all the components shown, depending on the battery type or configuration. In addition, a current collector 20 may be disposed on one or both of the anode 12 and cathode 14. The current collector 20 may be formed of any suitable material. For example, the current collector 20 for the anode 12 may be copper and the current collector 20 for the cathode 14 may be aluminum.

In at least one embodiment, the anode 12 may include graphite (e.g., natural, artificial, or surface modified) as the active material. However, any suitable active material may be used, for example, hard carbon, soft carbon, lithium titanate oxide (LTO), silicon or tin-enriched graphite or carbonaceous compounds. In at least one embodiment, the cathode 14 may include a lithium nickel cobalt manganese oxide (NCM) active material. However, any suitable active material may be used, for example, lithium nickel cobalt aluminum oxide (NCA), lithium manganese spinel oxide (Mn Spinel or LMO), and lithium iron phosphate (LFP) and its derivatives lithium mixed metal phosphate (LFMP). In addition, mixtures of any of two or more of these materials may be used, for example a mixture of NCM and LMO.

The separator 16 may be formed of any suitable material, for example, a polyolefin, such as polyethylene or polypropylene. The electrolyte 18 may include a liquid electrolyte including a lithium salt and an organic solvent. The lithium salt may include, but is not limited to, $LiPF_6$, $LiBF_4$, $LiClO_4$, $LiCF_3SO_3$ or combinations thereof. The organic solvent may include, but are not limited to, ethylene carbonate (EC), ethylene-methyl carbonate (EMC), dimethyl carbonate (DMC), diethyl carbonate (DEC) or combinations thereof. The concentration of the lithium salt and the volume/weight ratios of the organic solvents may be any suitable values, which are known by one of ordinary skill in the art. For example, the electrolyte may include 1 M $LiPF_6$ and EC:EMC (3:7 weight ratio).

With further reference to FIG. 1, the battery 10 may include a proton absorbing or scavenging material 22. The proton absorbing material (PAM) 22 may be a material that reacts with a proton, thereby preventing it from reacting with other materials. In at least one embodiment, the PAM 22 is an inorganic material. The PAM 22 may be a metal or a metal alloy, such that when it reacts with a proton a metal hydride (MHx) is formed. The PAM 22 may therefore have proton desorbed and proton absorbed states. The reaction may be described as follows:

$$H^+ + M + e^- \rightarrow MHx \quad (eq. 4)$$

In at least one embodiment, the PAM 22 is an atomic intermetallic material. The atomic intermetallic material may be represented as $A_xB_y$, where A is a first metal or metal alloy, B is a second metal or metal alloy that is different from the first, and x and y are integers that are greater than or equal to one. Non-limiting examples of suitable intermetallic materials include $AB_5$-type alloys, $AB_2$-type alloys, zirconium-nickel (Zr—Ni)-based alloys, and vanadium (V)-based BCC type alloys. The PAM 22 may have a hydrogen absorbency of at least 0.5% hydrogen by weight of the PAM 22. For example, the PAM 22 may absorb at least 0.75, 1, 2, 3, 4, or 5% hydrogen by weight of the PAM 22. In one embodiment, the PAM 22 may have a hydrogen absorbency of 0.5 to 4.0% hydrogen by weight of the PAM 22. In another embodiment, the PAM 22 may have a hydrogen absorbency of 0.75 to 3.5% hydrogen by weight of the PAM 22. In another embodiment, the PAM 22 may have a hydrogen absorbency of 1 to 3% hydrogen by weight of the PAM 22. For example, $LaNi_5$ ($AB_5$) may absorb about 1.4 wt. % hydrogen (forming $LaNi_5H_6$) and $ZrV_2$ ($AB_2$) may absorb about 3.0 wt. % hydrogen (forming $ZrV_2H_{5.5}$). While the PAM 22 may absorb hydrogen in the amounts disclosed, it is to be understood that if the concentration of hydrogen ions in the electrolyte is below the saturation point of the PAM 22, then the PAM 22 may absorb less hydrogen by weight than the amounts disclosed.

$AB_5$ alloys may generally combine a hydride forming metal, A, with a non-hydride forming metal, B. The A element may be a rare earth metal, for example, lanthanum (La), cerium (Ce), neodymium (Nd), praseodymium (Pr), samarium (Sm), yttrium (Y), or others. The A element may also be a mixture of rare earth metals, which may be known as a "mischmetal" (Mm). A mischmetal may be a natural mixture of rare earth elements, mostly including Ce (30-52%), La (13-25 wt. %), and one or more of Nd, Pr, and Sm (13-57%), where the amounts may depend on the place of origin. The B element may be Ni, which may be alloyed with other metals. If the Ni is alloyed, the alloying metal may be, for example, cobalt (Co), tin (Sn), aluminum (Al), iron (Fe), or others. The $AB_5$ alloy may be any combination of the A and B elements above, for example, $LaNi_5$, $MmNi_5$, $Mm(Ni—Co—Al—Mn)_5$, or others. One of ordinary skill in the art will recognize that numerous specific alloy compositions may be formulated using the alloying elements described. In addition, the formula may deviate from $AB_5$ slightly, such that the composition is, for example, $A_{1.1}B_5$ or $AB_{5.1}$. For example, the $AB_5$ alloy may be $MmNi_{3.55}Mn_{0.4}Al_{0.3}Co_{0.75}$, $LaNi_{4.7}Sn_{0.3}$, $LaNi_{2.5}Co_{2.5}$, or other formulations.

$AB_2$ alloys (also known as Laves phases) may generally combine titanium (Ti), Zr, hafnium (Hf), or alloys thereof as element A and a transition metal as element B. Non-limiting examples of suitable B elements may include manganese (Mn), Ni, chromium (Cr), V, Fe, or others. The $AB_2$ alloy may be any combination of the A and B elements above, for example, $ZrMn_2$, $TiCr_2$, $HfNi_2$, or others. In addition, one of ordinary skill in the art will recognize that numerous specific alloy compositions may be formulated using the alloying elements described. In addition, the formula may deviate from $AB_2$ slightly, such that the composition is, for example, $A_{1.1}B_2$ or $AB_{2.1}$. For example, the $AB_2$ alloy may be $ZrFe_{1.5}Cr_{0.5}$, $TiMn_{1.4}V_{0.6}$, $(Ti_{0.9}Zr_{0.1})_{1.1}CrMn$, $Mn_{0.9}V_{0.1}Fe_{0.5}Ni_{0.5}$, $ZrMn_{0.9}V_{0.1}Fe_{0.5}Co_{0.5}$, or other formulations.

The PAM 22 may also be a Zr—Ni-based alloy. The Zr—Ni alloy may include additional alloying elements, for example, Co, Mn, Ti, Cr, Nb, Sn, Si, or others. One of ordinary skill in the art will recognize that numerous specific alloy compositions may be formulated using the alloying elements described. In another embodiment, the PAM 22 may be a V-based BCC-type alloy, wherein BCC refers to the crystal structure of the alloy (body-centered cubic). In at least one embodiment, the vanadium alloy may include titanium. The vanadium and/or V—Ti alloy may also be alloyed with other metals, for example, Al, silicon (Si), Zr, Cr, Fe, Co, Ni, niobium (Nb), tantalum (Ta), Mn, or others. The V-based alloy may include any combination of the above elements. Non-limiting examples of suitable alloys may include V—Ti—Cr, V—Ti—Mn, V—Ti—Ni, V—Ti—Cr—Mn, or others. One of ordinary skill in the art will recognize that numerous specific alloy compositions may be formulated using the alloying elements described.

As discussed above, HF may be formed in electrolytes including $LiPF_6$ (or other lithium salts) when the $LiPF_6$(sol.) and/or $PF_5$(sol.) react with trace amounts of water in the electrolyte. The HF, in turn, may react with the cathode material (e.g., LiMOx, wherein M may be Mn, Co, Al, Ni, Fe, FemPx, or others, or a combination thereof), forming water molecules as a product. The water produced may then react with the remaining $LiPF_6$(sol.) and/or $PF_5$(sol.), which creates more HF, which then may react with the cathode materials, continuing the cycle of degradation of the cathode materials and consuming the $LiPF_6$ in the electrolyte. If the cycle is not slowed or stopped, all of the $LiPF_6$ may be consumed, causing significant performance reduction in the Li-ion cell and reducing the calendar life and cycle time of the cell.

Without being held to any particular theory, it is believed that the PAM 22 (e.g., an intermetallic material), absorbs protons in the electrolyte by capturing $H^+$ ions in the electrolyte. By capturing the $H^+$ ions, they may be prevented from reacting with the electrode materials (e.g., the cathode active material). If the PAM 22 prevents at least some of the $H^+$ ions from reacting with the electrode materials, then the production of water can be reduced or eliminated. The reduction or elimination of water production may therefore reduce or eliminate the production of additional HF, thereby further reducing or eliminating reactions with the electrode materials. Accordingly, by absorbing a portion, substantially all, or all of the $H^+$ ions in the electrolyte, the cycle of electrode material degradation and $LiPF_6$ consumption may be slowed or stopped. The inclusion of PAM 22 may therefore suppress or eliminate the side reactions of the electrode materials and/or the electrolyte, reduce or eliminate the consumption of $LiPF_6$, stabilize the electrolyte, reduce or eliminate HF formation, and/or stabilize the inner pressure of the Li-ion cell. As a result, an increase in electrical resistance of the electrodes may be prevented, as well as increased gas evolution, both of which may improve the performance and life cycle of the battery.

While the reaction between the hydrogen ions and the PAM 22 may be reversible, it may be possible to prevent desorption of the hydrogen, for example, by selecting appropriate PAM materials and operating conditions of the battery. Desorption is favored at high temperatures and low pressures. Therefore, for a certain PAM material chosen, the temperature and pressure of the battery may be maintained at values that do not favor desorption. Alternatively, if the battery conditions cannot be adjusted, materials that do not favor absorption at those conditions may be chosen. In addition, desorption may be favored at high potentials. Therefore, by not allowing the battery to deep discharge, desorption may be mitigated or prevented.

The PAM 22 may be present in the battery in any suitable form, such as a powder or a film. In FIG. 1, the PAM 22 is shown as a powder 24, which may be present within the anode 12 and/or the cathode 14. In one embodiment, the powder 24 may be combined with the electrode materials as they are prepared. For example, as is known in the art, a cathode active material may be combined with a binder (e.g., PVDF) to form a slurry, which is then cast onto a current collector or separator and then dried. Accordingly, the powder 24 may be included in the slurry during the electrode production such that it is present in the electrode when it dries.

Figure 2:
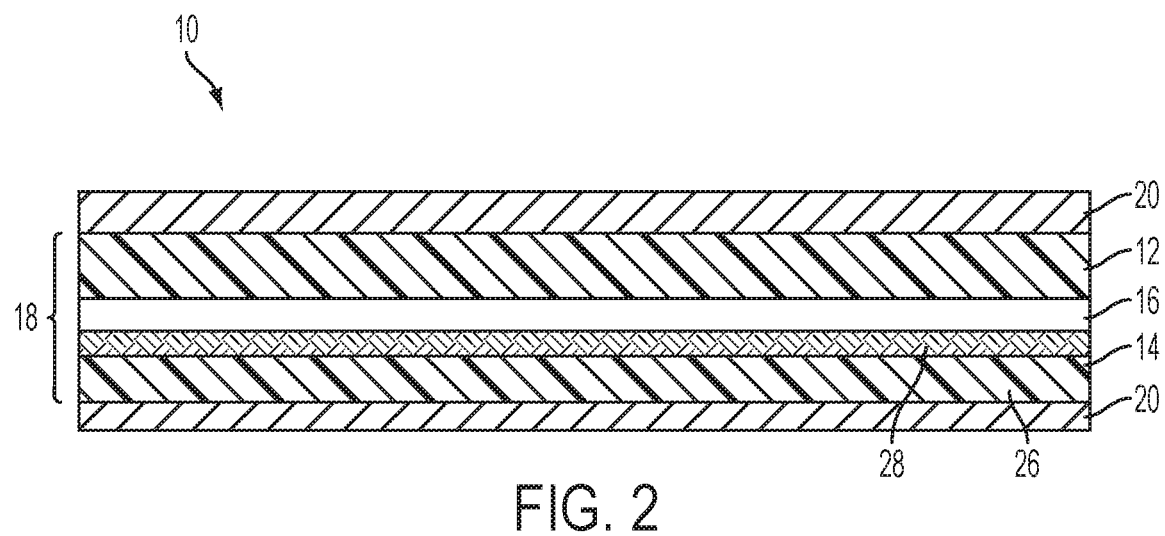
FIG. 2 is a schematic of a lithium-ion battery including an electrode having a layer of proton absorbing material, according to an embodiment.

In another embodiment, the powder 24 may be coated or otherwise applied to an already fabricated anode and/or cathode. The anode 12 and/or cathode 14 may therefore have two layers in some embodiments, as shown in FIG. 2. The first layer 26 may include the anode/cathode active material and the second layer 28 may include the PAM 22. Regardless of how the powder 24 is incorporated into/on the electrode, it may be included in a portion of the electrode surface or it may be included in the entire electrode surface. The surface including the powder 24 (e.g., the second layer 28) may be a surface that is configured to be adjacent to the separator 16 of the battery cell 10. In another embodiment, the surface including the powder 24 may alternatively be a surface that is configured to be adjacent to a current collector 20. In another embodiment, both the surface configured to be adjacent to the separator 16 and the surface adjacent to the current collector 20 may include the powder 24. In addition, the powder 24 may be present throughout a portion or all of the bulk of the anode 12 and/or cathode 14, not only at one or more surfaces.

The PAM 22 may be applied to the anode and/or cathode using any suitable method, for example, spin coating, dip coating, slurry painting, tape casting, slot die coating, micro gravure coating, sputtering, or others. The resulting coating (e.g., the second layer 28), may have a thickness of 0.1 to 10 μm, or any sub-range therein. For example, the coating may have a thickness of 0.5 to 5 μm, 0.5 to 3 μm, 0.7 to 2 μm, or others. In one embodiment, the PAM 22 is a powder 24 having a particle size of about 1 μm. The coating may be one to several particles thick, and therefore may have a thickness of about 1, 2, or 3 μm.

In at least one embodiment, the anode 12 and/or cathode 14 may include 0.01 to 5 wt. % PAM 22, or any sub-range therein. For example, the anode 12 and/or cathode 14 may include 0.05 to 1 wt. %, 0.05 to 0.5 wt. %, 0.07 to 0.5 wt. %, 0.1 to 0.5 wt. %, 0.1 to 0.3 wt. %, or other sub-ranges within 0.05 to 5 wt. %. The PAM 22 may be present in amounts greater than 5 wt. %, however, battery performance may begin to decline without significant additional proton absorption. The PAM 22 may also be present in amount less than 0.05 wt. %, however, the proton absorption may not be adequate to significantly slow or stop the $LiPF_6$ decomposition cycle. Since the anode 12 and/or cathode 14 include the PAM 22 in relatively small amounts (e.g., 5 wt. % or less), the initial performance of the battery 10 may be substantially unaffected. In addition, the addition of the PAM 22 may improve battery performance over time, relative to the same battery without the PAM, since the electrode materials will not be degraded to the same extent or at all.

EXAMPLES

A 2.5 Ah 18650 lithium-ion battery (18 mm in diameter, 65 mm in height) may include 16 g of NCM cathode material. A $LaNi_5$ PAM has a hydrogen absorbency of about 1.4% hydrogen by weight of the $LaNi_5$. The battery may require about 5 g of electrolyte, which may have a moisture content of 30 to 50 ppm. Accordingly, about 0.2 g of $LaNi_5$ may be required to absorb the hydrogen ions from the moisture content. Therefore, the cathode includes about 0.125% of $LaNi_5$ by weight.

Figure 3:
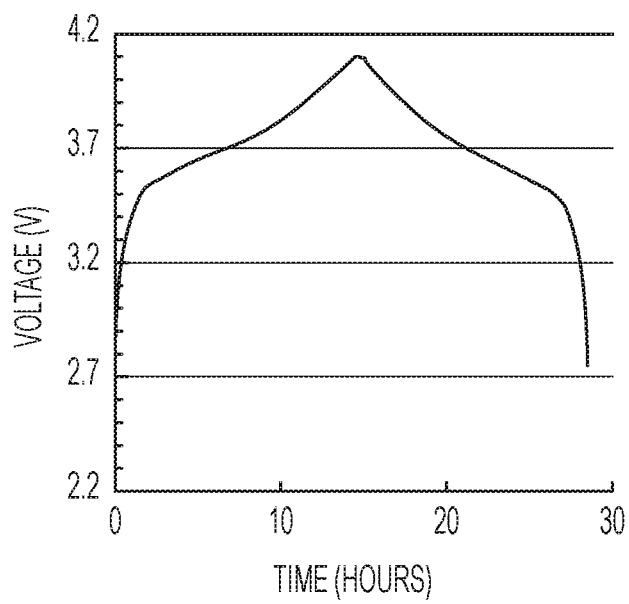
FIG. 3 is a charge-discharge curve of a full coin cell including a proton absorbing material in the anode and cathode.

A full coin cell Li-ion battery was constructed, including a PAM powder of $LaNi_5$ incorporated into the anode and the cathode. The anode active material was graphite and the cathode had an NCM active material. The electrolyte included 1 M $LiPF_6$ and EC:EMC (3:7 weight ratio). A full charge and discharge curve of the full coin cell is shown in FIG. 3. The curve shows that the cell including the $LaNi_5$ operates as normal, with no apparent side reaction between the $LaNi_5$ and the electrolyte.

Figure 4:
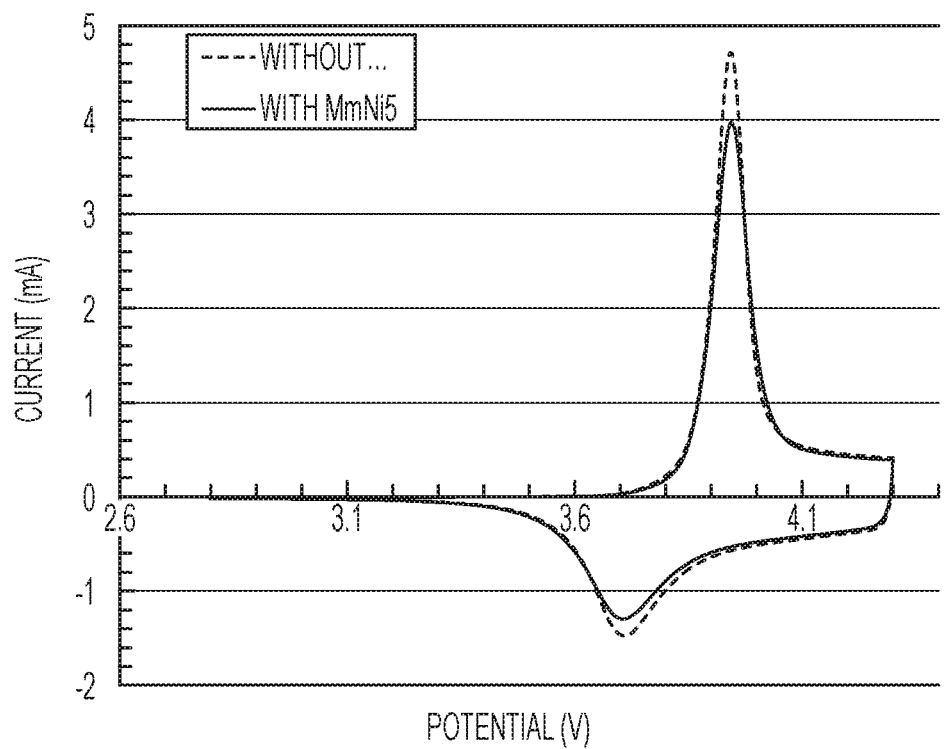
FIG. 4 shows two cyclic voltammogram curves at first cycle, one of a half coin cell including a proton absorbing material and one of a half coin cell without a proton absorbing material.

A half coin cell was constructed, including a PAM powder of $MmNi_{3.6}Al_{0.4}Mn_{0.3}Co_{0.7}$ applied to the cathode surface. The cathode had an NCM active material and the electrolyte included 1 M LiPF6 and EC:EMC (3:7 weight ratio). Two cyclic voltammetry tests were conducted: one on the half coin cell including the PAM powder and one on a half coin cell without it, as shown in FIG. 4. The results show that no side reactions occurred between the proton absorbing material and the electrolyte, indicating that the PAM acted as a proton absorber with no significant adverse impacts on cell performance.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method, comprising:
preparing a positive electrode slurry and a negative electrode slurry, each slurry including an active material and a binder;
mixing an atomic intermetallic material including a proton absorbed state into at least one of the slurries;
forming positive and negative electrodes from the slurries; and
forming a lithium-ion battery including the electrodes, a separator, and an electrolyte including a lithium salt.

2. The method of claim 1, wherein the mixing step includes mixing the atomic intermetallic material into at least one of the slurries such that they include 0.01 to 5 wt. % of the atomic intermetallic material after casting.

3. The method of claim 1, wherein the atomic intermetallic material is mixed into the at least one slurry as a powder.

4. The method of claim 1, wherein the atomic intermetallic material is mixed into at least the positive electrode slurry.

5. The method of claim 1, wherein after casting, the atomic intermetallic material is present throughout a bulk of the positive electrode and/or the negative electrode.

6. The method of claim 1, wherein the atomic intermetallic material includes an $A_xB_y$ alloy, wherein A is a first metal or metal alloy, B is a second metal or metal alloy different from the first, and x and y are integers greater than or equal to 1.

7. The method of claim 6, wherein the $A_xB_y$ alloy is an $AB_5$ or an $AB_2$ alloy.

8. The method of claim 1, wherein the atomic intermetallic material has a hydrogen absorbency from 0.5% to 4.0% by weight of the atomic intermetallic material.

9. A method, comprising:
applying an atomic intermetallic material including a proton absorbed state to at least one of a lithium-ion battery positive electrode or negative electrode; and
forming a lithium-ion battery including the electrodes, a separator, and an electrolyte including a lithium salt.

10. The method of claim 9, wherein the atomic intermetallic material is applied to a surface of at least the positive electrode.

11. The method of claim 9, wherein the atomic intermetallic material is applied as a powder.

12. The method of claim 9, wherein the atomic intermetallic material is applied as a surface layer overlying the positive electrode and/or the negative electrode.

13. The method of claim 12, wherein the atomic intermetallic material is applied by spin coating, dip coating, slurry painting, tape casting, slot die coating, micro gravure coating, or sputtering.

14. The method of claim 9, wherein the atomic intermetallic material is applied to a separator-side of the positive electrode and/or the negative electrode.

15. The method of claim 9, wherein the atomic intermetallic material is applied to a current collector-side of the positive electrode and/or the negative electrode.

16. The method of claim 9, wherein the atomic intermetallic material is applied to at least one of the positive electrode or negative electrode such that they include 0.01 to 5 wt. % of the atomic intermetallic material after the atomic intermetallic material is applied.

17. The method of claim 9, wherein the atomic intermetallic material includes an $A_xB_y$ alloy, wherein A is a first metal or metal alloy, B is a second metal or metal alloy different from the first, and x and y are integers greater than or equal to 1.

18. The method of claim 9, wherein the atomic intermetallic material has a hydrogen absorbency from 0.5% to 4.0% by weight of the atomic intermetallic material.

19. A method of scavenging hydrogen in a lithium-ion battery, comprising:
introducing an atomic intermetallic material in at least one of a positive electrode or a negative electrode of a lithium-ion battery including a separator and an electrolyte including a lithium salt; and
reacting hydrogen present in the lithium-ion battery with the atomic intermetallic material to form a metal hydride.

20. The method of claim 19, wherein the atomic intermetallic material is included in at least one of the positive electrode or the negative electrode by mixing the atomic intermetallic material with materials of the positive electrode and/or the negative electrode during their preparation or by applying the atomic intermetallic material to the positive electrode and/or the negative electrode after they have been formed.

* * * * *